United States Patent
Rabaey et al.

(10) Patent No.: US 9,919,271 B2
(45) Date of Patent: Mar. 20, 2018

(54) ELECTROCHEMICAL PROCESSES TO SEPARATE PRODUCTS DERIVED FROM BIOLOGICAL CONVERSIONS

(71) Applicant: Universiteit Gent, Ghent (BE)

(72) Inventors: Korneel Rabaey, Bachte-Maria-Leerne (BE); Christian Stevens, Merelbeke (BE)

(73) Assignee: UNIVERSITEIT GENT, Ghent (BE)

( * ) Notice: Subject to any disclaimer, the term of this patent is extended or adjusted under 35 U.S.C. 154(b) by 440 days.

(21) Appl. No.: 14/375,388

(22) PCT Filed: Jan. 30, 2013

(86) PCT No.: PCT/EP2013/051735
§ 371 (c)(1),
(2) Date: Jul. 29, 2014

(87) PCT Pub. No.: WO2013/113724
PCT Pub. Date: Aug. 8, 2013

(65) Prior Publication Data
US 2015/0014169 A1    Jan. 15, 2015

(30) Foreign Application Priority Data

Jan. 30, 2012 (EP) .................................... 12153077
Aug. 16, 2012 (EP) .................................... 12180727

(51) Int. Cl.
*B01D 61/44* (2006.01)
*B01D 61/42* (2006.01)
(Continued)

(52) U.S. Cl.
CPC .......... *B01D 61/44* (2013.01); *B01D 61/422* (2013.01); *C02F 1/469* (2013.01); *C02F 3/005* (2013.01);
(Continued)

(58) Field of Classification Search
CPC .... B01D 61/422; B01D 61/44; B01D 61/445; B01D 61/46; B01D 61/50; C02F 1/4693; C02F 2201/46115
See application file for complete search history.

(56) References Cited

U.S. PATENT DOCUMENTS 2,860,095 A * 11/1958 Katz ...................... B01D 61/46
204/296
3,341,441 A * 9/1967 Giuffrida ............... B01D 61/52
204/525
(Continued)

FOREIGN PATENT DOCUMENTS

JP    6-246296 A    9/1994
JP    9-271781 A    10/1997
(Continued)

OTHER PUBLICATIONS

Li et al, "An Electrokinetic Bioreactor: Using Direct Electric Current for Enhanced Lactic Acid Fermentation and Product Recovery," Tetrahedron 60 (2004), p. 655-661.*
(Continued)

*Primary Examiner* — Ibrahime A Abraham
*Assistant Examiner* — Salil Jain
(74) *Attorney, Agent, or Firm* — TraskBritt, P.C.

(57) ABSTRACT

The disclosure relates to efficient methods of controlling biological conversions while simultaneously removing and converting some of the generated products. More specifically, and, for example, the disclosure discloses electrochemical processes to remove and capture potentially toxic ammonium during anaerobic digestions and to remove and capture carboxylic acids during bioethanol production. The disclosure can, thus, be used to enhance bioproduction processes via controlling pH and/or reduction/oxidation, in combination with in situ product recovery.

5 Claims, 6 Drawing Sheets

(51) Int. Cl.
*C02F 3/00* (2006.01)
*C02F 1/469* (2006.01)
*C02F 101/16* (2006.01)
*C02F 1/20* (2006.01)
*C02F 101/10* (2006.01)

(52) U.S. Cl.
CPC ...... *B01D 2311/06* (2013.01); *B01D 2311/18* (2013.01); *B01D 2311/2603* (2013.01); *B01D 2311/2626* (2013.01); *B01D 2311/2661* (2013.01); *B01D 2311/2669* (2013.01); *B01D 2311/2688* (2013.01); *C02F 1/20* (2013.01); *C02F 2101/101* (2013.01); *C02F 2101/105* (2013.01); *C02F 2101/16* (2013.01); *C02F 2201/4618* (2013.01); *C02F 2201/46115* (2013.01)

(56) References Cited

U.S. PATENT DOCUMENTS

| | | | |
|---|---|---|---|
| 5,681,728 A | 10/1997 | Mao | |
| 5,746,920 A | 5/1998 | Boergardts | |
| 2004/0033573 A1* | 2/2004 | Norddahl | C12P 7/56 435/139 |
| 2004/0137587 A1* | 7/2004 | Baets | B01D 61/44 435/139 |
| 2004/0262161 A1* | 12/2004 | Rauls | C07C 51/42 204/537 |
| 2006/0189821 A1* | 8/2006 | Gallagher | C07C 51/09 560/77 |
| 2008/0047838 A1* | 2/2008 | Van Erkel | B01D 11/0492 205/352 |

FOREIGN PATENT DOCUMENTS

| | | | | |
|---|---|---|---|---|
| JP | 10-142395 | A | 5/1998 | |
| JP | H10142395 | * | 5/1998 | ............... C02F 1/28 |
| WO | 9641021 | A1 | 12/1996 | |
| WO | 2013113724 | A2 | 8/2013 | |

OTHER PUBLICATIONS

Boniardi, N. et al., Lactic acid production by electrodialysis Part I: Experimental tests, Journal of Applied Electrochemistry, vol. 27, pp. 125-133, 1997.
Boniardi, N. et al., Lactic acid production by electrodialysis Part I: Modelling, Journal of Applied Electrochemistry, vol. 27, pp. 135-145, 1997.
Nomura, Y. et al., Acetic Acid Production by an Electrodialysis Fermentation Method with a Computerized Control System, Applied and Environmental Microbiology, Jan. 1988, pp. 137-145.
Wong, M. et al., Application of bipolar electrodialysis to *E. coli* fermentation for simultaneous acetate removal and pH control Biotechnol Lett, vol. 32, pp. 1053-1057, 2010.
Hongo et al., Novel Method of Lactic Acid Production by Electrodialysis Fermentation, Applied and Environmental Microbiology, Aug. 1, 1986, pp. 314-319, vol. 52, No. 2, American Society for Microbiology, US.
Li et al., An electrokinetic bioreactor: using direct electric current for enhanced lactic acid fermentation and product recovery, Tetrahedron, Jan. 12, 2004, pp. 655-661, vol. 60, No. 3, Elsevier Science Publishers, Amsterdam, NL.
PCT International Search Report, PCT/EP2013/051735, dated Jan. 30, 2013.
PCT International Preliminary Report on Patentability, PCT/EP2013/051735, dated Jun. 12, 2014.
PCT Written Opinion of the International Preliminary Examining Authority, PCT/EP2013/051735, dated Feb. 17, 2014.
Applicant's Response to PCT Written Opinion of the International Preliminary Examining Authority, PCT/EP2013/051735, dated Feb. 17, 2014.
PCT Written Opinion of the International Preliminary Examining Authority, PCT/EP2013/051735, dated Mar. 24, 2014.
Applicant's Response to PCT Written Opinion of the International Preliminary Examining Authority, PCT/EP2013/051735, dated Mar. 24, 2014.
Applicant's letter to European Patent Office dated Apr. 14, 2014 with re-typed set of claims.

* cited by examiner

ELECTROCHEMICAL PROCESSES TO SEPARATE PRODUCTS DERIVED FROM BIOLOGICAL CONVERSIONS

CROSS-REFERENCE TO RELATED APPLICATIONS

This application is a national phase entry under 35 U.S.C. § 371 of International Patent Application PCT/EP2013/051735, filed Jan. 30, 2013, designating the United States of America and published in English as International Patent Publication WO2013/113724 A2 on Aug. 8, 2013, which claims the benefit under Article 8 of the Patent Cooperation Treaty to European Application Serial Nos. 12153077.8, filed Jan. 30, 2012 and 12180727.5, filed Aug. 16, 2012.

TECHNICAL FIELD

The disclosure relates to a method to increase the flux of target ionic species in an electrochemical cell. This leads to efficient methods of controlling biological conversions while simultaneously removing and converting some of the generated products. More specifically, and, for example, the disclosure discloses electrochemical processes to remove and capture carboxylic acids or potentially toxic ammonium during fermentations or anaerobic digestions, respectively. The disclosure can, thus, be used to enhance bioproduction processes via controlling pH and/or reduction/oxidation, in combination with in situ product recovery.

BACKGROUND

During anaerobic digestion, ammonium is present in waste streams such as slaughterhouse wastewater, protein-rich biomass and other biomass streams can become toxic due to an increased ammonium concentration in combination with elevated pH levels. This ammonium needs removal from the digester in order to achieve successful biogas production. In the past several approaches have been presented, principally including the addition of alkaline solutions, such as caustic, and subsequent acids to strip out the ammonia and capture it. These approaches entail high chemical costs as well as addition of considerable quantities of ions to the digester fluid. There is hence a need for a technology able to separate ammonia without consumption of expensive chemicals for stripping and/or capture.

Several studies further described the removal of ammonium from waste streams via transport towards the cathode and subsequent volatilization following high pH. However, in these studies the ammonium flux was not selectively enhanced by the cathodic accumulation of non-target ions leading to a mobility determined by electric field only besides a small gradient caused by ammonia volatilization.

Also anions, the issue with ammonium is a cation based issue, can be problematic for biological conversions. The fermentation of biomass to, e.g., bioethanol leads to the production of acetate. As the fermentation causes decreasing pH, the acetate is converted to acetic acid, which is toxic for most microorganisms. Present approaches to maintain fermentations include the addition of caustic solutions, which elevate the pH and enable further biological activity. This caustic addition is costly and leads to an increased salinity of the fermenter broth itself, which is undesired particularly in closed loop systems. There is hence a need for a technology that can separate out acetate in combination with elevating pH without considerable increase of the broth ionic strength.

Not only acetate as an anion can cause toxicity, most anionic organics formed during fermentation, such as butyric, caproic or caprylic acid can have the same negative impact. Interestingly, these chemicals have a considerable market value, if presented in a purified form. Thus, while microbial production processes exist for any of these chemicals, and in extension others such as succinate, citric acid, maleic acid, formic acid and others, these endproducts often exert some level of toxicity to the producing organism. Moreover, if present in a broth particularly coming from mixed culture fermentations or as a spent broth after a bioproduction process, the recovery of these products is as yet not economical.

A technique that allows separation of ionic products from fermentation broths is electrodialysis (ED). In ED, two electrodes are separated via a sequence of multiple, alternating anion and cation exchange membranes. This allows the removal from one solution of both anions and cations, to be captured in a concentrate solution. While apparently attractive in the aforementioned context, ED suffers from low ionic efficiency (as predominantly other ions such as sodium or chloride are separated) and are not always compatible with the viscous nature of the fermentation broths or the digester fluids. As an example on the use of electrodialysis, we refer to Boniardi and coworkers (Journal of Applied Electrochemistry 27, p 125-133 1977).

In so-called bipolar electrodialysis (Wong et al. Biotechnology Letters 32 pp. 1053-1057 2010), it has, moreover, been shown that application of electrical current to an *Escherichia coli* culture fermenting glucose did not negatively impact this organism, while increasing solution pH as well as transporting acetate from the broth to a counter compartment. In this compartment a recovery solution was brought. However, the process still led to a weak solution of the formed acetate in the recovery compartment. Moreover, the latter study is very similar to earlier work by Nomura and coworkers (Applied and Environmental Microbiology 54(1) pp. 137-142 1988) in which acetate production was improved from ethanol in an ED stack.

The key drawbacks from the above methods are that the products are not yet recovered at high strength, that the efficiency of the transfer from the products towards the recovery compartment is limited or that the system is not amenable to process viscous fluids as present in many bioproduction settings.

BRIEF SUMMARY

The application relates to an electrochemical process to separate products from a microbial broth using at least two electrode compartments separated by a separator wherein: a) an electrode in a first compartment is in contact with a microbial broth flowing through the first compartment, b) target ions present in the microbial broth are separated from the broth via an electricity driven product flow towards a second compartment, c) a solution is flowing through the second compartment, d) the second compartment comprises another electrode and the solution flowing through the second compartment has a pH, which is different from the pH of the broth by at least 2 pH units, and f) the concentration of non-target ions of the same polarity of the target ions of the solution in the second compartment is higher than the concentration of non-target ions of the same polarity of the target ions of the broth by at least a factor 2.

The disclosure further relates to a process, as described above, wherein the flow rate of the broth in the first compartment is higher by a factor 2 than the flow rate of the solution in the second compartment.

The disclosure further relates to a process, as described above, wherein the broth is a fluid in which anaerobic digestion, fermentation or other microbial processes occur.

The disclosure specifically relates to a process, as described above, wherein the electrode in the first compartment is an anode is in contact with the broth and wherein the target ions are cations, which are transported towards the second compartment comprising a cathode.

A preferred cation is ammonium and the pH of the solution in the second compartment allows the conversion of the ammonium in ammonia. The non-target cation in the cathode compartment is, for example, potassium or sodium.

The disclosure further relates to a process, as described above, in which the pH is elevated and is caused by cathodic reduction of water or oxygen.

The disclosure also relates to a process, as described above, wherein the separator is a cation selective membrane and/or wherein the ammonium is further recovered as ammonia in a fluid.

Alternatively, the disclosure relates to a process, as described above, wherein the electrode in the first compartment is a cathode in contact with the broth and wherein the target ions are anions, which are transported towards the second compartment comprising an anode. An example of the non-target anion in the anode compartment is chloride, sulfate, phosphate or nitrate. A specific example of the target anion is chosen from the list of carboxylate, acetate, citrate, succinate, pyruvate, maleate, oxalate, lactate or caproate.

The disclosure further relates to a process, as described above, wherein the pH of the solution in the second compartment allows conversion of the target anion to a less negatively charged ion that can be removed. The less negatively charged ion can be removed by volatilization with the introduction of a gas stream in the second compartment or by chemical modification. The chemical modification is, for example, a reaction with an alcohol to create an ester.

The disclosure also relates to a process, as described above, wherein the pH of the solution in the second compartment is lower than in the other compartment and is caused by anodic oxidation, and/or, to a process, as described above, in which the anode and the cathode are separated by an anion exchange membrane.

The disclosure further relates to a process, as described above, in which the anode electrode is separated from the cathode electrode via two membranes including, from the anode to the cathode: a first cation exchange membrane and subsequently an anion exchange membrane, and, wherein the target ions are recovered in the middle compartment between the membranes.

DETAILED DESCRIPTION

Figure 1:
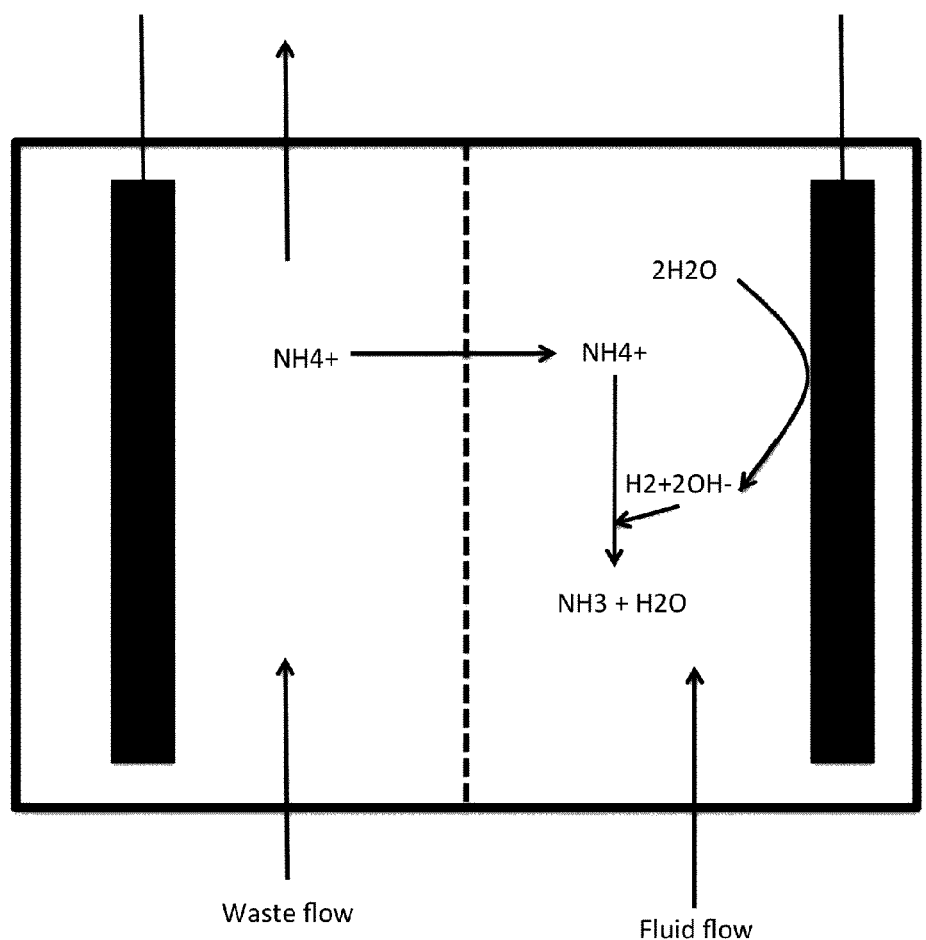
FIG. 1 shows an electrochemical cell with an anode and a cathode, separated by an ion exchange membrane, preferably a cation exchange membrane. A wastewater flow goes through the anode, due to the oxidative process, cations need to migrate from anode to cathode. Ammonium thus moves from anode to cathode. At the cathode, an alkaline solution is generated with higher salinity than the anode. This leads to the formation of ammonia from ammonium. This ammonia can be stripped from the cathode solution and subsequently recovered.
Figure 2:
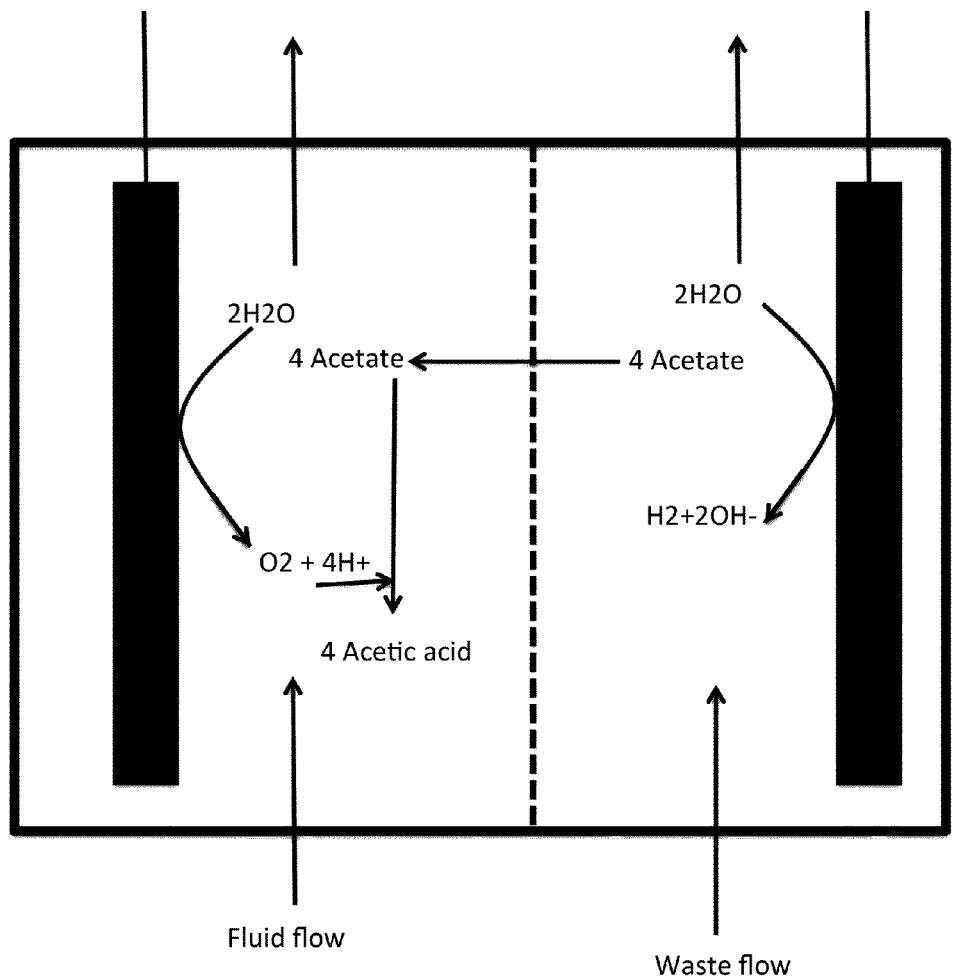
FIG. 2 shows an electrochemical cell with an anode and a cathode, separated by an ion exchange membrane, preferably an anion exchange membrane. A wastewater flow goes through the cathode, due to the reductive process anions need to migrate from cathode to anode. Acetate thus moves from cathode to anode. At the anode, an acidic solution is generated with higher salinity than the cathode. This leads to the formation of acetic acid from acetate. This acetic acid can be stripped from the anode solution and subsequently recovered. Alternatively, the acetic acid can react with an alcohol present in the anode to form an ester.
Figure 3:
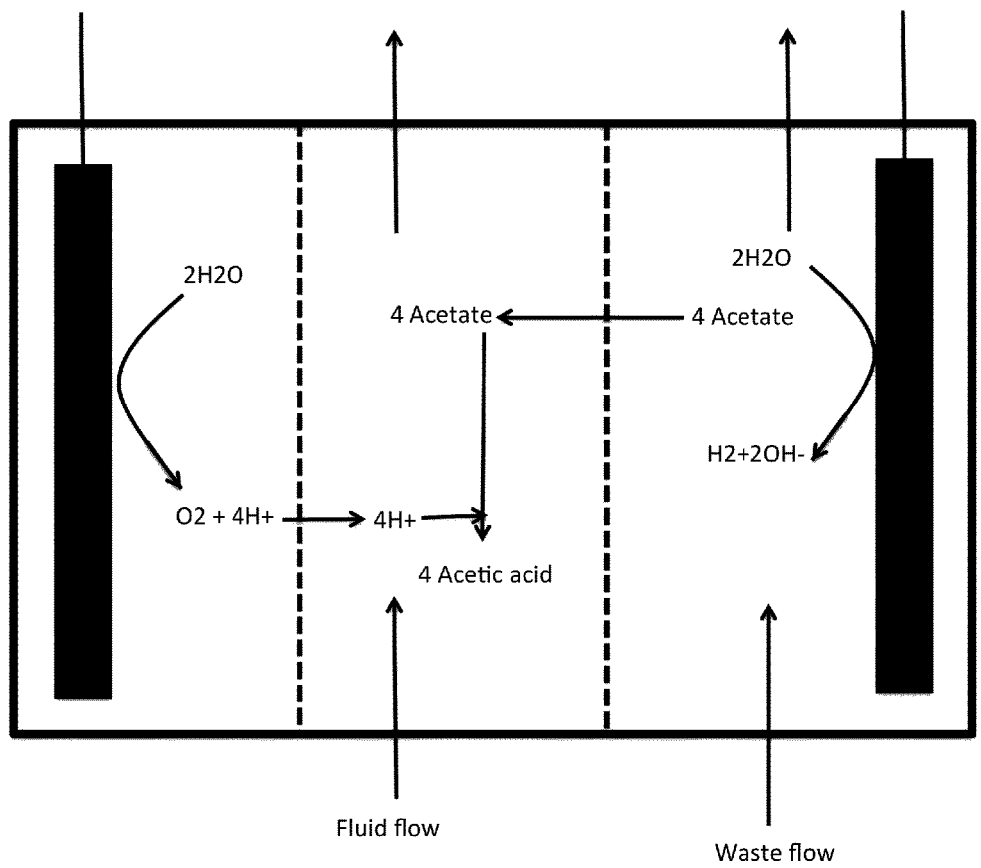
FIG. 3 shows a different embodiment of FIG. 2 in which the anode electrode is only indirectly in contact with the recovery compartment and serves to modify the ionic content of the recovery compartment as well as its pH without directly interacting with the recovery fluid. The separator separating the anode electrode from the recovery compartment is, for example, a cation exchange membrane, while the recovery compartment is separated from the cathode by an anion exchange membrane. The latter can be useful in case the recovery fluid contains chloride, which can react at the anode. It is clear that the reverse can be achieved for a cathode and that such combinations can entail multiple anodes, multiple cathodes and multiple membranes in serial or parallel stacking modes.

A solution to the aforementioned problems in terms of efficiency of electrochemical extraction is to selectively enhance the flux of target ions from the broth to the receiving compartment. In the context of carboxylates, this implies high carboxylate flux towards the anode and subsequent recovery of the carboxylate in any form. This also implies low flux of other, undesired (non-target) ions such as sulphate, phosphate, carbonate. In the context of positively charged ions as target ions such as ammonium, this implies high target ion flux towards the cathode and subsequent recovery of the target ions. This also implies low flux of other, undesired ions such as sodium and calcium ions.

The disclosure discloses an electrochemical process in which at least two electrode compartments are separated by a separator, such as an anion exchange membrane or a cation exchange membrane. In direct or indirect contact with one of the electrodes is a microbial broth. In the other electrode compartment is a solution with a higher strength (=a higher concentration) of ions different from the target ions than the microbial broth and/or a different pH. Preferably, the ionic strength is a factor two relative to the broth. Preferably, the pH is different from the pH of the broth by at least two pH units.

Electrical current drives migration of the charged products (anionic or cationic) towards the counter compartment of the compartment containing the broth and the (charged) products. The flux of desired products (which are also denominated as target ions) is increased by maintaining a high concentration of non-target ions in the receiving compartment and maintaining a low concentration of target ions in the receiving compartment. This can be achieved by accumulating non-target ions in the receiving compartment by, e.g., decreasing the net fluid flow (not considering recirculations) through the receiving compartment relative to the broth fluid flow and simultaneously allowing the pH to differ with at least two pH units from the broth pH. This causes in the receiving compartment a modification of the 'target ions' to a form that can be removed (this 'form' is also denominated the 'desired' product). For example, carboxylates will be converted into more volatile carboxylic acids. For example, ammonium will be converted into more volatile ammonia. The non-target ions are not converted in the receiving compartment, causing accumulation of these ions due to the lower fluid flow relative to the broth. The increase of concentration of the non-target ions causes back diffusion of these ions to the broth, thereby decreasing the net flux of non-target ions. Non-limiting examples of the "reaction of the products" are indicated further. Non-limiting examples of non-target ions in the context of cations are sodium, potassium, magnesium, calcium and other cations as known to a person skilled in the art. Non-limiting examples of non-target ions in the context of anions are chloride, sulphate, carbonate, nitrate, phosphate and others as known to a person skilled in the art.

Therefore, the disclosure relates in a first instance to an electrochemical process using at least two electrode compartments separated by a separator wherein the electrode in a first compartment is (directly or indirectly) in contact with a microbial broth and wherein the products (target ions) present in the microbial broth are separated from the broth via an electricity driven product flow towards a second compartment (or counter compartment) comprising another electrode in direct or indirect contact with a solution in which both the concentration of non-target ions and the pH are different from the broth by at least a factor 2 and two pH units, respectively. The broth specifically relates to a fluid in which anaerobic digestion, fermentation or other microbial processes occur.

In another and more specific embodiment of the disclosure, a fluid as present in anaerobic digesters or fermenters and containing ammonia is sent through the anode compartment of an electrochemical system. The fluid may be in direct contact with the anode electrode or the electrode may be shielded by a separator such as an ion exchange membrane. Examples of anodes are iridium oxide coated titanium electrodes or other electrodes typically known as dimensionally stable anodes, or other electrodes suitable for use in the fluid of the disclosure. The anode compartment is separated from the cathode compartment by a separator, preferably ion selective, preferably cation selective. The flow of electrical current through the electrochemical system will force cation migration from anode to cathode. Examples of cations are ammonium (target ions), and, sodium and potassium (non-target ions). In the cathode compartment, a reduction process occurs such as water reduction to hydrogen gas. Due to the influx of other cations than protons, the pH in the cathode will increase. In case the fluid flow or flow rate in the cathode is smaller (by at least a factor two) than the anode fluid flow or flow rate and in case the cathode fluid contains cations such as sodium, potassium or other cations at higher concentration than present in the anode fluid, the ionic strength of the cathode fluid will be higher than the anode fluid. In some cases salts such as sodium chloride or bases such as sodium hydroxide can be added to the fluid flow entering the cathode. This in turn results in backdiffusion of sodium and other ions from cathode to anode which limits the net flux of these ions. As charge balance needs to be maintained across the electrochemical cell, this will increase the net flux of target ions such as ammonium. The high pH value of the cathode causes ammonium arriving in the cathode to be converted to ammonia, if the pH is sufficiently elevated. This implies that the ammonia can be stripped and backdiffusion of ammonia limited. In combination with high ionic strength by other ions, this effect will increase the ammonium flux from anode to cathode, while allowing stripping of the ammonia.

Therefore, the disclosure relates to a process as indicated above wherein the electrode in the first compartment is an anode in contact with the broth and wherein the products are cations, which are transported towards the second compartment comprising a cathode. The disclosure specifically relates to a process, as mentioned above, wherein the cation is ammonium and wherein the pH and concentration of non-target ions of the solution in the second compartment is at least two pH units higher and a unit 2 higher, respectively, than the said broth allowing the conversion of the ammonium in ammonia. The disclosure further specifically relates to a process, according as indicated above, in which the non-target cation is sodium, potassium, calcium, magnesium or other cations as known to a person skilled in the art.

The disclosure specifically relates a process, as mentioned above, wherein the elevated pH is caused by cathodic reduction of water, oxygen or other compounds. In addition, the disclosure relates to a process, as indicated above, wherein the separator is a cation selective membrane.

In some embodiments, the fluid in the anode or the cathode can be supplemented with a salt such as NaCl or $Na_2SO_4$ or others as known to a person skilled in the art to allow for a higher salinity of the fluid.

In some embodiments, the cathode electrode is separated from the receiving fluid (fluid adjacent to the membrane separating the anode) by preferably an anion exchange membrane. This limits the transfer of cations towards the cathode electrode. The cathode electrode can, thus, be immersed in a fluid containing, e.g., NaCl. Hydroxyl ions generated at the cathode migrate through the anion exchange membrane to the receiving fluid while cations transferred from the anode to the receiving fluid cannot come in direct contact with the cathode electrode.

In a further embodiment, the ammonia, mixed typically with hydrogen gas, is sent through an aqueous phase in which ammonia can be captured as ammonium. In a further embodiment, the aqueous phase contains carbonate and in a further embodiment this carbonate was obtained by capturing $CO_2$ from a gas stream.

In another embodiment, the capturing aqueous phase contains other acidifying ions such as sulphate or nitrate.

In a further embodiment, hydrogen gas coming from the cathode can be mixed with biogas or another gas stream to increase its caloric value.

The disclosure, thus, further relates to a process, as indicated above, in which the elevated pH allows removal of the ammonia from the second compartment via stripping or any other means, and, to a process, as indicated above, wherein the ammonia is further recovered in a fluid and/or wherein the fluid has a pH lower than 8.

The disclosure further relates to a process, as mentioned above, wherein the pH is decreased by carbonate obtainable from the dissolution of biogas or other $CO_2$ containing gases and wherein the process leads to the production of ammonium carbonate.

In a different embodiment, a microbial broth or effluent is in direct or indirect contact with a cathode. Examples of cathode materials are carbon, steel, nickel and others as known to a person skilled in the art. The cathode can be in direct contact with the broth, or can be shielded by a separator such as, for example, an anion exchange membrane. The current flowing through the cathode leads to the formation of hydrogen gas or the release of electrons to the fermentation broth or effluent. The consumption of protons by the cathode may also lead to an increase in pH, which in many cases leads to improved bioprocess performance. In case hydrogen gas is formed in situ, this may also alter the outcomes of the fermentation. For example, high hydrogen partial pressure leads to the production of caproic acid from acetate and ethanol (Steinbusch et al. Energy and environmental science 4 pp. 216-224 2011). The broth is separated from the anode compartment by a separator, by preference an ion selective separator, by preference an anion exchange membrane. Formed target anions, such as acetate, caproate, formate, succinate, maleate, fumarate, citrate, caprylate or other anionic products as known to a person skilled in the art will migrate from cathode to anode. In the anode compartment, an oxidative process occurs such as water oxidation to oxygen gas. Due to the influx of other anions than hydroxyl, the pH in the anode decreases. In case the fluid flow in the anode is smaller than the cathode fluid flow or in case the incoming anode fluid contains non-target anions such as sulphate, chloride, nitrate or other anions at higher concentration than present in the anode fluid, the ionic strength of the anode fluid will be higher than the cathode fluid. In some cases salts such as sodium sulphate or acids such as hydrogen sulphate can be added to the fluid flow entering the anode. This in turn results in backdiffusion of sulphate and other ions from anode to cathode. The low pH value of the cathode causes anionic organics arriving in the anode to be converted to a neutral or protonated form. Examples are the conversion of acetate to acetic acid, caproate to caproic acid, succinate to succinic acid, lactate to lactic acid.

Hence, the disclosure further relates to a process, as indicated above, wherein the electrode in the first compartment is a cathode in contact with the broth and wherein the products are anions, which are transported towards the second compartment comprising an anode.

The disclosure further specifically relates to a process, according as indicated above, in which the non-target anion is chloride, sulfate, phosphate or nitrate or other anions as known to a person skilled in the art.

The disclosure, thus, further relates to a process, as indicated above, wherein the target anions are chosen from the (the non-limiting) list of carboxylate, acetate, citrate, succinate, pyruvate, maleate, oxalate, lactate or any other microbially produced anionic product. The processes of the disclosure more specifically relate to processes wherein the pH of the solution in the second compartment is at least two pH units lower than the pH of the broth and wherein the concentration of the non-target anions in the second compartment is at least twice as high as the concentration of the target anions. In one embodiment, the fluid flow through the anode is lower than through the cathode, preferably by at least a factor 2.

In one embodiment of the previous, a gas flow is directed through the anode leading to the volatilization of the organic products. The stripped organics can then be recovered and/or fractionated via diverse means as known to a person skilled in the art.

In another embodiment of the previous, a chemical reaction of the anions arrived from the cathode occurs. For example, in acidic conditions carboxylic acids, such as acetic acid or caproic acid, can react with alcohols such as ethanol. This leads to the formation of compounds such as ethylacetate and ethylcaproate, which can be separated from the broth. The removal of these compounds enhances the transfer from cathode to anode.

Hence, the disclosure relates to a process, as mentioned above, wherein the pH of the anode allows conversion the anion to a less negatively charged ion that can be removed via stripping or any other means. More specifically, the disclosure relates to the latter processes in which the less negatively charged ion could be removed by volatilization with the introduction of a gas stream in the second compartment or by chemical modification. The chemical modification includes the reaction with an alcohol to create an ester. In addition, the disclosure relates to a process, as indicated above, wherein the lower pH is caused by anodic oxidation.

In some embodiments, the anode electrode is separated from the receiving fluid (fluid adjacent to the membrane separating the cathode) by preferably a cation exchange membrane. This limits the transfer of chloride towards the anode electrode. The anode electrode can, thus, be immersed in a fluid containing, e.g., $Na_2SO_4$. Protons generated at the anode migrate through the cation exchange membrane to the receiving fluid while chloride transferred from the cathode to the receiving fluid cannot come in direct contact with the anode electrode.

Summarizing, the disclosure relates to electrochemical methods or processes in which increased salinity generally in combination with altered pH allows increased diffusion of products or toxic compounds to a recovery compartment, as well as allowing separation of these products from the recovery compartment. In several of the above embodiments, the main aim of the compound removal was decrease of its toxicity in a biological conversion process. In addition to this, the proposed disclosure can be used to enhance a bioproduction process by pH and/or reduction/oxidation control in combination with in situ product recovery.

The disclosure will now be illustrated by the following non-limiting examples.

EXAMPLES

Example 1

Figure 4:
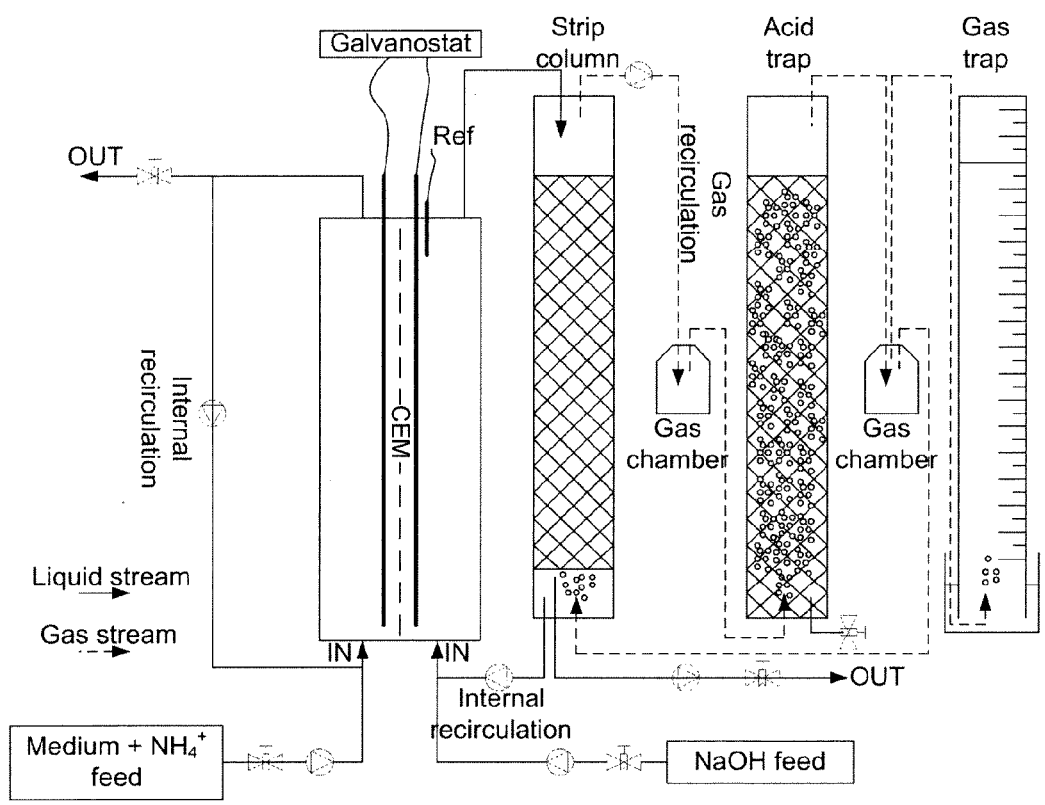
FIG. 4 shows the set-up, as described in Example 1, including electrochemical cell and absorbers. The cathode fluid is sent through a stripping column, where a carrier gas such as nitrogen gas or air goes through the cathode fluid and strips the ammonia. The gas phase containing the ammonia is subsequently sent to an absorber where an acid fluid captures the ammonia as ammonium.

The present example demonstrates the extraction of ammonia from a synthetic wastewater. Ammonium was provided at 5 g per L to the anode, together with modified M9 medium in a set-up as shown in FIG. 4. In the cathode a pH 13 solution was maintained via the electrochemical reduction and appropriate feed flow. Currents of 10, 20 and 30 A $m^{-2}$ were applied to the electrochemical cell (currents relative to anode projected surface area on membrane). The ammonium transported to the cathode was converted to ammonia, which was subsequently stripped by sending the cathode fluid through a stripping column in which a carrier gas (nitrogen) was brought. The carrier gas with the ammonia was captured in a low pH solution of sulfuric acid in an absorber. The recovery of the ammonia relative to the applied current depended on the current density, in that at higher current densities the efficiency expressed as units ammonia recovered relative to units current provided to the system decreased as can be observed in FIG. 5A. The aforementioned issue is mainly due to the nature of the synthetic wastewater, while real wastewaters will have more alkalinity and higher flow leading to decreased pH decrease at the anode and thus increased ammonium flux relative to current density. In all cases a significant increase (experiments performed in duplicate) of the ammonium flux relative to open circuit (no current) was achieved, demonstrating the ability to increase ammonium flux combined here with recovery of the ammonia without addition of caustic soda or other chemicals as typical for present-day approaches. A current efficiency of 77% could be reached at 10 A m$^{-2}$, meaning that the transfer of every mol of electrons to the cathode was accompanied by 0.77 mol $NH_4^+$.

Example 2

The present example shows the influence of the nitrogen concentration on the ammonium flux in a set-up shown in FIG. 4. At 20 A m$^{-2}$ current density, the nitrogen flux increased 3-fold when increasing the ammonium concentration in the anode feed from 1 to 5 g $NH_4^+$—N L$^{-1}$, as well as the current efficiency from 37% to 51%. In contrast, the OC nitrogen flux did not increase further at a nitrogen concentration in the anode of 3 g $NH_4^+$—N L$^{-1}$ Example 3

Figure 5:
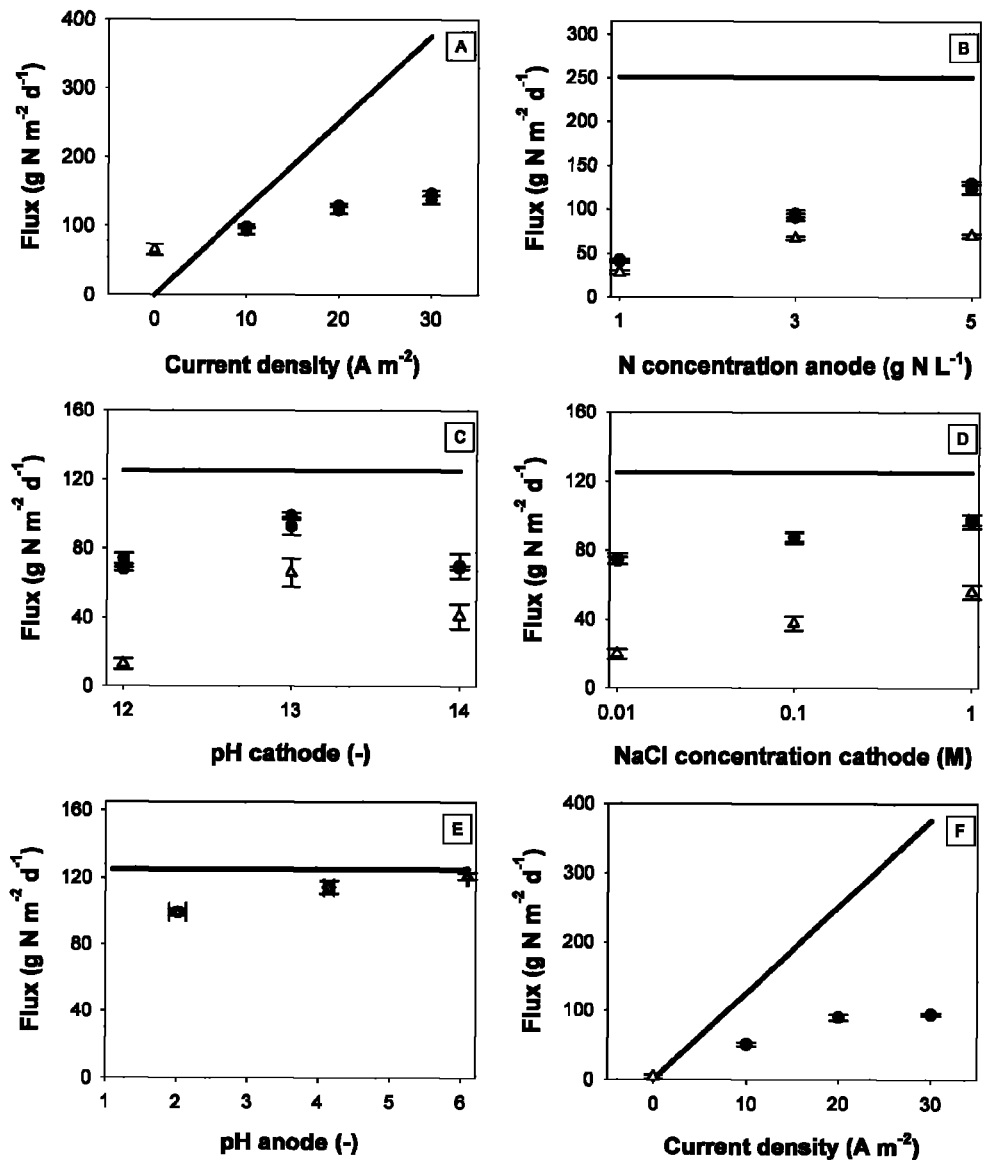
FIG. 5 shows the results of experiments in which the ammonium flux from anode to cathode was investigated under different operational conditions, that is, influence of applied current density (A), anode $NH_4^+$ concentration (B), cathode pH (C), cathode NaCl concentration (D) and anode pH (E). A-E are experiments performed with synthetic wastewater. In (F) the influence of the current density on nitrogen flux was investigated with digestate. The black solid line indicates 100% current efficiency for $NH_4^+$ transfer to the cathode. Symbols: A-D: triangles: open circuit flux, black and grey circles: closed circuit flux (duplicated); E: circle: anode flow 4 L $L^{-1}$ anode compartment $d^{-1}$, square: anode flow 66 L $L^{-1}$ anode compartment $d^{-1}$, triangle: anode flow 131 L $L^{-1}$ anode compartment $d^{-1}$; F: triangle: open circuit flux, black circles: closed circuit flux (not duplicated).

The present example shows the combined influence cathode ionic strength and cathode pH on the ammonium flux in a set-up shown in FIG. 4. The combined influence of cathode ionic strength and pH on the nitrogen flux was investigated by using different concentrations of NaOH as the cathode feed. Interestingly, the CC nitrogen flux showed an optimum at a cathode pH of 13 (0.1 M NaOH), whereas the OC showed a similar profile (FIG. 5C). This aspect was further investigated by applying different NaCl concentrations to the cathode compartment. Furthermore, the cell was not coupled to the stripping and absorption unit to prevent substantial pH differences in the cathode as the stripping process consumes hydroxyl ions. In this case, NaOH was produced in-situ due to the cathodic reduction of 2 $H_2O$ to $H_2$ and 2 OH$^-$, resulting in a pH of 10.1-10.5 in the cathode compartment. This time, no peak of the nitrogen flux was observed at 0.1 M NaCl, i.e., equal ionic strength as 0.1 M NaOH. Instead, a linearly increasing trend of the nitrogen flux could be observed within the range tested (FIG. 5D).

Example 4

Protons have a higher mobility relative to the other cations, implying that protons can play an important role in balancing the electron flux. Therefore, the present example shows the influence of the anode pH on the ammonium flux in a set-up shown in FIG. 4. The anode flow was increased from 4 to 66 and 131 L L$^{-1}$ anode compartment d$^{-1}$, which resulted in a pH in the anode compartment of 4.1 and 6.1, respectively. The significantly lower proton concentration in case of pH 6 had a clear effect on the nitrogen flux, which increased with about 26% (FIG. 5E), and a current efficiency of 96% could be obtained.

Example 5

In the present example, digestate was used as anode feed to investigate the nitrogen flux in a real matrix in a set-up shown in FIG. 4. The attainable nitrogen flux with digestate (±2 g N L$^{-1}$) at different applied current densities was comparable to the fluxes obtained with synthetic wastewater (FIGS. 5A and 5F). For instance, at 20 A m$^{-2}$ with synthetic wastewater containing 3 g N L$^{-1}$, a flux of 95 g N m$^{-2}$ d$^{-1}$ was obtained compared to 90 g N m$^{-2}$ d$^{-1}$ with digestate containing ±2 g N L$^{-1}$.

Example 6

Figure 6:
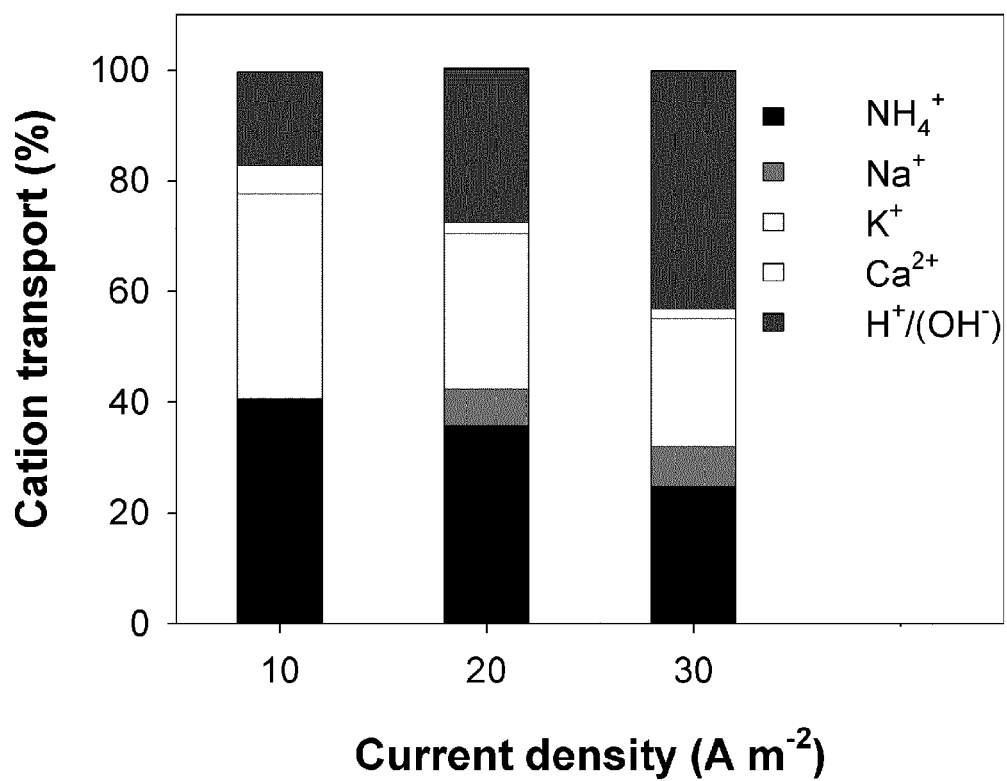
FIG. 6 shows relative contribution of cations to the charge balance in function of the applied current density during operation with digestate.

In the present example, the relative contribution of the different cations present in the digestate that balance the electron flux are investigated in a set-up shown in FIG. 4. FIG. 6 demonstrates that current efficiencies of 40% can be obtained for $NH_4^+$, and that charge balancing by protons or reversed hydroxyl flux from cathode to anode increases with increasing current densities. Furthermore, the Na$^+$ flux is relatively low despite a similar concentration to $NH_4^+$ in the digestate. Potassium, also an interesting nutrient, was removed at a rate of 130-243 g K$^+$ m$^{-2}$ d$^{-1}$, depending on the applied current density, leading to K$^+$ removal efficiencies of 33% to 68%. This figure clearly demonstrates the selective transfer of $NH_4^+$ and K$^+$ over Na$^+$, due to the similar Na$^+$ concentration in both compartments. Even though Na$^+$ was 28% of the cationic strength in the anode, it represented only 0% to 7.1% of the flux towards the cathode, depending on the applied current density.

Example 7

An electrochemical cell similar to the cell described previously is set up using an IrOx coated titanium electrode as anode and a graphite felt cathode. A broth containing fatty acids and alcohols is sent through the cathode compartment. In the anode an electrolyte is brought containing initially 0.01M of $Na_2SO_4$. Current is applied leading to formation of protons at the anode, which acidifies the anode fluid. An anion exchange membrane separates the anode from the cathode. At the cathode, the pH increases due to the reduction of water. In the broth increasing concentrations of caproate have been observed (pH 5.5 ~3 g/L caproate). This caproate is transported through the anion exchange membrane from the cathode to the anode. To the anode ethanol is added which reacts with caproate in the presence of an acid solution containing sulphate to form ethyl caproate. The latter product is separated from the broth by sending a gas flow of nitrogen gas through the anode fluid. The gas flow is subsequently sent through a distillation column allowing recovery of the ethyl caproate.

The invention claimed is:

1. An electrochemical process to separate target anions from a microbial broth, the process comprising:
contacting a cathode in a first compartment of an electrochemical system with the microbial broth, the microbial broth comprising the target anions and non-target anions, the target anions selected from the group consisting of carboxylate, acetate, citrate, succinate, pyruvate, maleate, oxalate, lactate, caproate, and mixtures thereof;

applying an electrical current between the cathode in the first compartment and an anode in a second compartment to transport the target anions of the microbial broth via an electrically driven product flow into the second compartment, the second compartment separated from the first compartment by an anion selective membrane; and reacting the target anions in the second compartment with a solution in the second compartment to form products comprising corresponding acids of the target anions, the solution comprising the non-target anions and having a pH less than the pH of the microbial broth by at least 2 pH units, the molar concentration in the second compartment of the non-target anions is greater by at least a factor of 2 than the molar concentration in the first compartment of the non-target anions, wherein the non-target anions in the second compartment comprise chloride, sulfate, phosphate or nitrate, wherein the net fluid flow of the microbial broth in the first compartment is greater by at least a factor of 2 than the net fluid flow of the solution in the second compartment, and the pH of the solution in the second compartment allows for conversion of the target anions to the products removable therefrom.

2. The process of claim 1, wherein the products comprising the corresponding acids of the target anions are removed by volatilization with the introduction of a gas stream into the second compartment.

3. The process of claim 1, wherein the products comprising the corresponding acids of the target anions are chemically modified before removal.

4. The process of claim 3, wherein the chemical modification is a reaction of the corresponding acids of the target anions with an alcohol to create an ester.

5. The process of claim 1, wherein the lower pH of the solution in the second compartment is caused by anodic oxidation.

* * * * *